(12) United States Patent
Warkentin et al.

(10) Patent No.: US 12,277,422 B2
(45) Date of Patent: Apr. 15, 2025

(54) DEVICE TREE RUNTIME MECHANISM

(71) Applicant: VMware LLC, Palo Alto, CA (US)

(72) Inventors: Andrei Warkentin, South Elgin, IL (US); Regis Duchesne, Vaud (CH); Renukanthan Raman, Los Altos, CA (US)

(73) Assignee: VMware LLC, Palo Alto, CA (US)

( * ) Notice: Subject to any disclaimer, the term of this patent is extended or adjusted under 35 U.S.C. 154(b) by 79 days.

(21) Appl. No.: 18/102,379

(22) Filed: Jan. 27, 2023

(65) Prior Publication Data
US 2024/0256286 A1 Aug. 1, 2024

(51) Int. Cl.
*G06F 9/4401* (2018.01)
(52) U.S. Cl.
CPC .......... *G06F 9/4401* (2013.01); *G06F 9/4411* (2013.01)
(58) Field of Classification Search
CPC .............................. G06F 9/4401; G06F 9/4411
See application file for complete search history.

(56) References Cited

U.S. PATENT DOCUMENTS

| 5,802,365 A | * | 9/1998 | Kathail | G06F 9/4411 |
| | | | | 719/321 |
| 7,096,473 B2 | * | 8/2006 | Ruget | G06F 9/4411 |
| | | | | 719/321 |
| 2004/0083196 A1 | * | 4/2004 | Reasor | G06F 12/0815 |
| 2004/0243534 A1 | * | 12/2004 | Culter | G06F 9/4411 |
| 2004/0255306 A1 | * | 12/2004 | Nicholes | G06F 9/4411 |
| | | | | 719/321 |
| 2020/0192679 A1 | * | 6/2020 | Chan | G06F 9/4411 |

OTHER PUBLICATIONS

Devicetree Specification Release v0.3-40-g7e1cc17; Power.org Inc., Freescale Semiconductor Inc., International Business Machines Corporation, Linaro Ltd., Arm Ltd; Nov. 30, 2021. (Year: 2021).*

* cited by examiner

*Primary Examiner* — Glenn A. Auve
(74) *Attorney, Agent, or Firm* — King Intellectual Asset (57) ABSTRACT

Systems and methods are included for causing a computing device to boot by retrieving hardware information from a device tree and further properties by utilizing a native access method call identified in the device tree. The access method can allow for getting a property, getting a property length, or setting a property. A table within firmware can identify the method, which then can retrieve the property information from memory. This Device tree Runtime ("DTRT") mechanism can allow the computing device to retrieve the hardware configuration and act as a power management interface for turning on the correct hardware and hardware properties on the computing device.

20 Claims, 3 Drawing Sheets

DEVICE TREE RUNTIME MECHANISM

BACKGROUND

Device tree is a data structure describing hardware components. Device tree allows the kernel of the operating system ("OS") to use and manage those components, including computer processing units ("CPUs"), memory, busses, and integrated peripherals. Many personal computers do not use device tree, and instead rely on an autoconfiguration protocol, such as Advanced Configuration and Power Interface ("ACPI"). ACPI allows an OS to discover and configure hardware components. ACPI and device tree are the two most common standards for identifying hardware components during boot.

Both have their positives and negatives. Device tree advantageously uses a simple format that is dense in memory and requires minimal runtime to parse. Device tree is suitable for code that runs in very minimal environments, such as without allocators. But Device tree also is just a description format rather than an abstraction layer over hardware. This means that a device tree description of a hardware system must "leak" as much information as necessary to make the hardware work. This requires modifying system software to deal with the details of the hardware.

ACPI beneficially includes an abstraction mechanism. ACPI describes a hierarchy of devices but does so differently than Device tree, instead describing the devices with interpreted bytecode. This allows for hiding many of the details that must be included in the device tree, such as behind-the-scenes manipulation of reset lines and registers. The firmware-level ACPI has three main components: the ACPI tables, the ACPI BIOS, and the ACPI registers. The ACPI BIOS generates ACPI tables and loads ACPI tables into main memory. Much of the firmware ACPI functionality is provided in bytecode of ACPI Machine Language ("AML"), a domain-specific, low-level language, stored in the ACPI tables. To make use of the ACPI tables, the OS relies on an interpreter for the AML bytecode.

Unfortunately, ACPI is also extremely overweight. The ACPI specification is large and a proper ACPI interpreter requires a lot of OS facilities to work. ACPI tables can be all over the random-access memory ("RAM") and can include many legacy and unused fields.

Additionally, ACPI's abstraction mechanism is lacking. AML is a bytecode of ACPI Source Language ("ASL"), which is mostly write-only and generally unmaintainable. AML is slow, single threaded, has subpar interactions with RAM, and does not allow for implementation of functions that must be asynchronous or wait on hardware. ACPI is also moving away from abstraction and towards a description.

Consequently, a need exists for improved systems and methods for discovering hardware during boot. Specifically, a need exists for a powerful and lightweight system definition and abstraction mechanism.

SUMMARY

Examples described herein include systems and methods for booting a computing device using device tree with an added lightweight system definition and abstraction mechanism. The mechanism can allow for making native code calls with device tree. The terms "computing device," "user device," and "mobile device" are used interchangeably throughout and can encompass any type of computing device, such as laptops, tablets, cell phones, and personal computers.

A computing device can utilize native code instead of AML with device tree. Adding the native code calls to a device tree can allow firmware of the computing device to make runtime calls to retrieve device properties that are not already available in the device tree. This can help reduce the size of the device tree while also adding dynamic flexibility in hardware description without the overweight abstraction of ASL in ACPI.

In one example, the runtime calls allow for getting a property or setting a property related to system hardware. System firmware can implement these calls. For example, in an ARM device, the firmware can be a hypervisor. At the OS level, the OS can interact with firmware to get a property, the length of a property, or set a property. The OS can do this through use of an application programming interface ("API"). When the property does not exist in the device tree, a property ID can be used for retrieving the property from memory. The device tree Runtime ("DTRT") mechanism can therefore allow the computing device to take advantage of the best parts of device tree and ACPI, with lighter weight abstraction. DTRT can allow the computing device to retrieve the hardware configuration and act as a power management interface for turning on the correct hardware and hardware properties on the computing device.

The device tree can include a DTRT node that identifies the platform and runtime method. This can allow for retrieving the access method and utilizing data in the DTRT node to make access method calls to retrieve properties not explicitly defined in the device tree. The DTRT API of the OS can interpret the DTRT node information and call runtime methods of the native platform to access additional hardware properties that are not pre-coded into the device tree.

DTRT can be utilized with multiple different computing platforms. Examples include Unified Extensible Firmware Interface ("UEFI"), UEFI runtime ("UEFI RT"), Advanced Risk Machine ("ARM") secure monitor call ("SMC") and hypervisor call ("HVC"), and Reduced Instruction Set Computer-V ("RISC-V"). For example, in the ARM platform, firmware calls can be used to retrieve or execute the runtime calls of DTRT. The processor can use the SMC service call range to make the runtime calls.

Both the foregoing general description and the following detailed description are exemplary and explanatory only and are not restrictive of the examples, as claimed.

DESCRIPTION OF THE EXAMPLES

Reference will now be made in detail to the present examples, including examples illustrated in the accompanying drawings. Wherever possible, the same reference numbers will be used throughout the drawings to refer to the same or like parts.

In an example, firmware in a computing device enables the computing device to utilize a device tree to retrieve hardware data while also supplementing with one or more properties based on native runtime calls. The hardware can then be managed by the OS or firmware, such as turning on power, registers, and the like, according to the hardware data and retrieved property.

The DTRT mechanism can effectively combine hardware data that is statically encoded into a device tree with runtime information retrieval based on information in the device tree. During boot of the computing device, the OS (which can include processes running as part of booting the OS) can retrieve hardware data and runtime method information from a device tree in firmware. The hardware data can include final values and identifiers in the device tree. The runtime method information instead can be used by an OS API to identify an access method. For example, the access method can be retrieved from a table in the firmware. The system can make a runtime call by executing the method to retrieve the property. The property can be any aspect of the hardware that is not already encoded in the device tree. Using the property and the hardware data, the operating system can manage physical hardware of the computing device.

Figure 1:
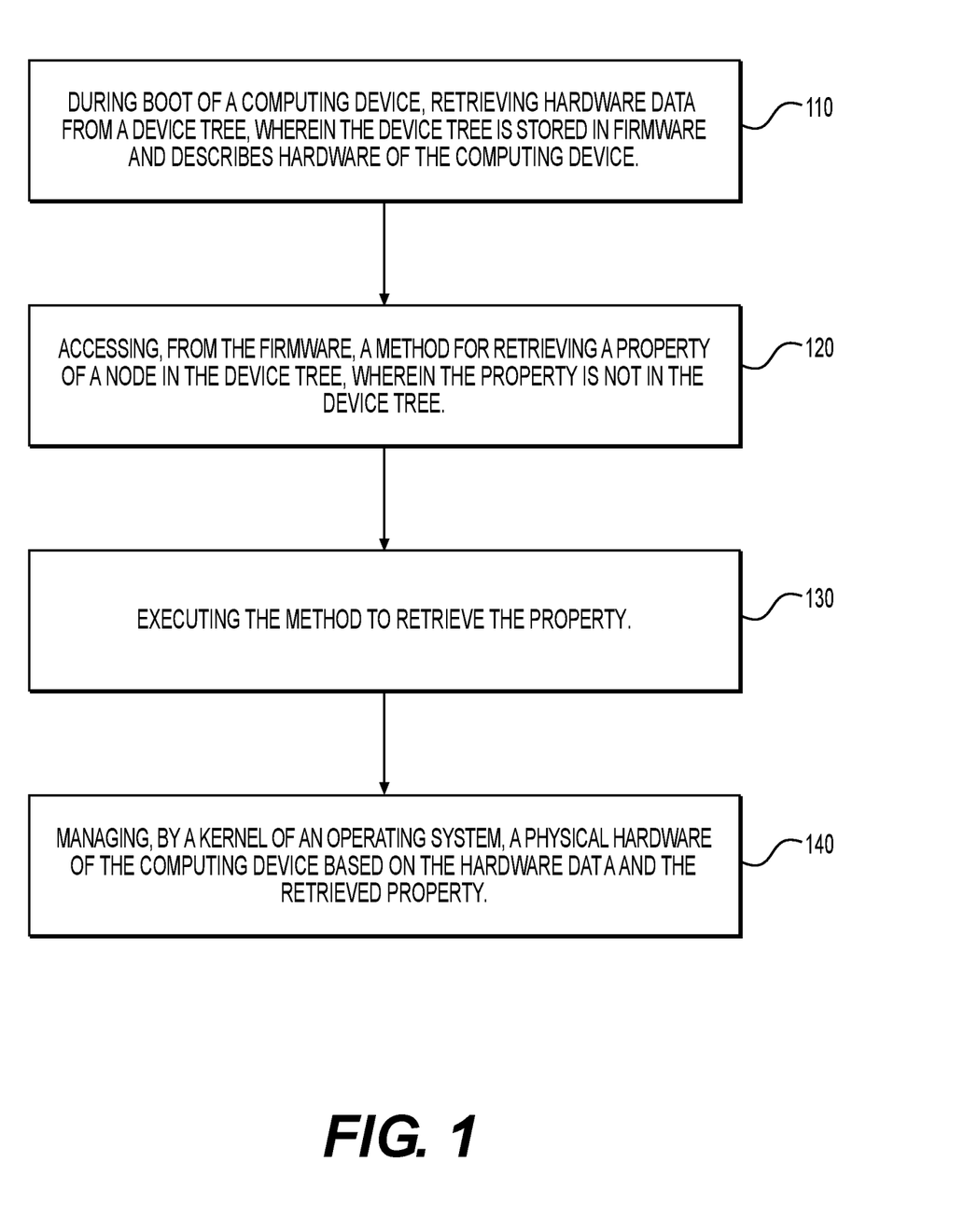
FIG. 1 is a flowchart of an exemplary method for managing hardware of a computing device by using device tree with runtime management calls.

FIG. 1 is a flowchart of an exemplary method for managing hardware of a computing device by using Device tree with runtime management calls. A computing device can be any processor-enabled device, such as a personal computer, laptop, tablet, or phone. The computing device can utilize DTRT as a powerful and lightweight abstraction mechanism for specifying, configuring, and powering hardware on the computing device.

At stage 110, the computing device can retrieve hardware data from a device tree during boot. The device tree can reside in firmware within the computing device. The device tree can describe hardware components of the computing device, such as by using key and value pairs within a table or similar structure. The data in the device tree can be static. That is, the device tree can define the data itself rather than specify a way to dynamically obtain or otherwise determine the data.

Device tree is a hierarchical store of data that is grouped into nodes. Keys are used to look up correlating values. For example, a key for an interrupt can correlate to a value with data about the interrupt. This data is not the instructions to get the data. Device tree therefore traditionally has been used in embedded and vertical environments, such as a mobile phone vendor with full control over the OS, applications, and most other aspects of the phone.

Table 1, below, includes an example Device tree description.

TABLE 1

```
/ {
  pci@0 {
    compatible = "arm,versatile-pci-hostbridge", "pci"
    #address-cells = <3>
    #size-cells = <2>;
    /*
    * These properties are not encoded in the node, but must be fetched
using the DT runtime API.
    * The 2nd value in the tuple is the property handle to pass to the
DTRT API.
    */
    dtrt-calls = < "status", 0 >,
                 < "ranges", 1 >,
                 < "dma-ranges", 2>,
```

TABLE 1-continued

```
                 < "bus-range", 3>,
                 < "interrupts", 4>
  };
};
```

Because the device tree nodes are stored in firmware and include the hardware data, the computing device only needs to access properties that are missing from the device tree. The device tree can identify DTRT calls that are recognized by an API of the OS in an example. The OS can utilize the information in the device tree to access a firmware table or other memory to retrieve the corresponding access method. The access method call can then access a property in memory, which gets returned to the OS for use in managing the system hardware.

In the example, of Table 1, the "dtrt-calls" includes status, ranges, dma-range, bus-range, and interrupts, all of which can be used by the OS API (also called the DTRT API herein). The second value in the tuple of Table 1 is the property handle to pass to the DTRT API. The properties can then be fetched by using the DTRT API.

At stage 120, the computing device can access, from the firmware, a method for retrieving a property of a node in the device tree. Again, the property itself is not in the device tree. The method can be located using the API, supplied with the values in the device tree.

Because everything in device tree is a property of a node, the access methods can be minimal. In one example, the methods are limited to "get property length," "get property," and "set property." These methods are to be implemented in native code that is part of the system firmware.

As stated above, the computing device can utilize an API to retrieve the access methods and, ultimately, the properties. For example, an OS-level API is shown below in Table 2.

TABLE 2

```
typedef void *phandle_t
typedef void *prhandle_t
typedef uintptr_t size_t
typedef uintptr_t offset_t
int dtrt_getprop(phandle_t node_handle, prhandle_t
property_handle, void *buf, offset_t offset, size_t len)
int dtrt_getproplen(phandle_t node_handle, prhandle_t
property_handle)
int dtrt_setprop(phandle_t node_handle, prhandle_t
property_handle, void *buf, offset_t offset, size_t len)
```

The API of Table 2 defines three property manipulation calls that can be used for accessing properties missing from the device tree. The three access methods are dtrt_getprop, dtrt_getproplen, and dtrt_setprop. Each are supplied with information from the device tree. For example, property_handle is the unique ID for the property name. It is used in place of a string to avoid the requirement for unchecked memory access (e.g. if implementation is in Arm EL3). This avoids virtual address to physical address translation.

The system is free to use bounce buffers as part of the DTRT mechanism. A bounce buffer refers to a type of memory buffer that is used to temporarily store data that is being transferred between devices with different memory alignment requirements. This is necessary because some devices, such as network cards, require data to be aligned on specific memory boundaries, while the computer's main memory may not be aligned in the same way. The bounce buffer acts as an intermediary, allowing the data to be transferred between the devices without causing errors or performance issues.

PRM would usually not use bounce buffers. But an SMC implementation might have a single global buffer and involve locking the buffer at an OS level.

Both getprop and setprop are allowed to have side effects, and thus can do anything that an ACPI method can do today. For example, getprop("status") could be equivalent to reading_STA, while setprop("status") could be equivalent of _PSO and _PS3 access. The access method dtrt_getprop can return, for example, the actual amount of data deposited into a buffer. The method dtrt_setprop can return the actual amount data "stored" in the property (e.g., parsed by a handler). The method dtrt_getproplen can return the maximum amount of data that dtrt_getprop may return. The method uintptr is an integer representation of a memory address.

A phandle (pointer handle) is a 32-bit value associated with a node that is used to uniquely identify that node so that the node can be referenced from a property in another node. More simply put, it is a property in one node that contains a pointer to another node.

The phandle property value is used by other nodes that need to refer to the node associated with the property. Phandle therefore acts as the unique ID for the property name.

At stage 130, the computing device can make a runtime call by executing the method to retrieve the property. An access method of the operating system can enable access to data on a disk, drive, or another memory device. The computing device can utilize native code for the runtime call, the native code not being written in AML. The native code and retrieval of the access methods can differ between different system types.

In one example, a Unified Extensible Firmware Interface ("UEFI") access method is retrieved from a Platform Runtime Mechanism ("PRM") table and executed. Alternatively, the method can be retrieved from the UEFI configuration table.

In another example, the method is retrieved from a Unified Extensible Firmware Interface ("UEFI") configuration table in the firmware. The method can also be an ARM secure monitor call ("SMC") or hypervisor call ("HVC").

Additional examples are included with regard to FIG. 2 below.

Continuing with FIG. 1, at stage 140, a kernel of the OS can manage a physical hardware of the computing device based on the static device hardware data and the retrieved property.

The ways in which an OS manages system hardware are numerous. Fundamentally, the OS needs to recognize what hardware is available for use on the computing device and ensure the hardware receives power. For example, the managing can include supplying power to a pin of the hardware device identified in the device tree in stage 110. The property retrieved in stage 130 can indicate a power level or the pin being identified by the retrieved property.

The OS generally provides a layer of abstraction between the physical hardware and the software that runs on the computing device. The OS also uses device drivers to communicate with and control the various hardware components, such as the CPU, memory, storage devices, and input/output devices.

Device drivers are specialized software that act as intermediaries between the OS and the hardware. They translate the generic commands and requests from the OS into specific instructions that the hardware can understand and execute. For the purposes of this disclosure, the drivers can be considered part of the OS.

The OS also provides a range of other features and functions to manage the system hardware. For example, the OS performs memory management. This can include the allocation and deallocation of memory to different programs and processes. Memory management can also include ensuring that the memory is used efficiently.

The OS can perform process management. This can include managing the execution of programs and process, including scheduling, prioritization, and monitoring of the processes and their interaction with system hardware.

The OS can perform input/output management. This can include managing the flow of data to and from the various input and output devices. Example input/output devices include a keyboard, mouse, touchpad, and display.

As already mentioned, the OS can perform power management. This includes managing power usage of different hardware components, turning on and off system hardware, and conserving energy and extending battery life on mobile computing devices.

Figure 2:
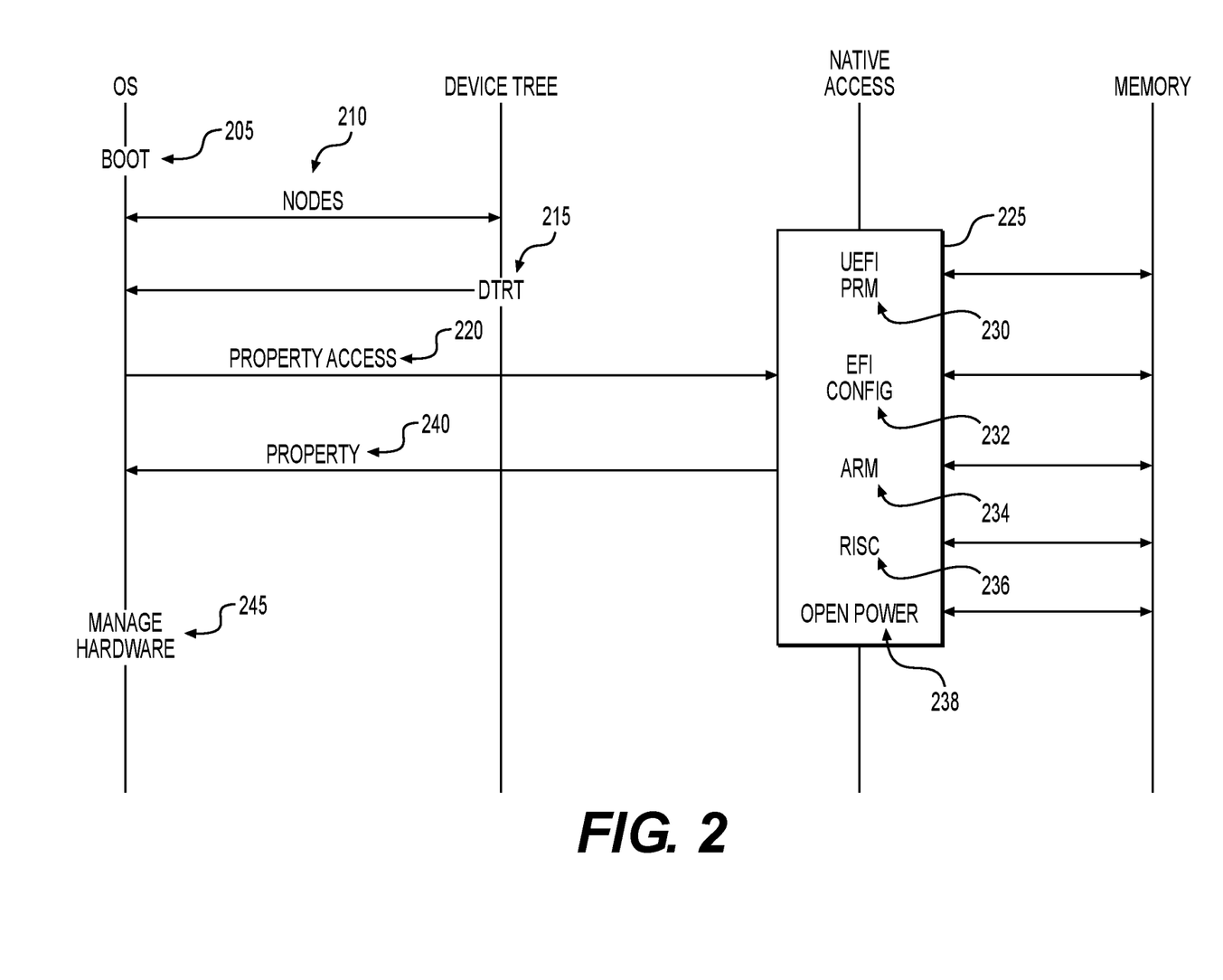
FIG. 2 is a sequence diagram of stages for managing hardware of a computing device by using device tree with runtime management calls.

FIG. 2 is a sequence diagram of stages for managing hardware of a computing device by using Device tree with runtime management calls. At stage 205, the computing device begins to boot. Low-level software and firmware begins to execute. For example, UEFI can begin executing and wake up hardware and a boot device for booting the OS.

As part of this process, at stage 210 the OS or boot device can traverse a device tree and begin gathering nodes that represent hardware on the computing device. The device tree is a data structure for describing hardware. Rather than hard-coding every detail of a computing device into the OS, many aspects of the hardware can be described in a data structure that is passed to the OS at boot time.

The device tree can also include a DTRT node. At stage 215, the device can read the DTRT node and be directed to an access method for obtaining additional hardware properties that are not in the device tree. This can add a dynamic aspect to the device tree, allowing for more customizable hardware properties and keeping the device tree relatively light with nodes that are more applicable to the computing device.

An example DTRT node is shown below in Table 3.

TABLE 3

```
/ {
    dtrt {
        compatible = "dt,runtime"
        access-method = "uefi-rt"
    };
};
```

The DTRT node can specify a type of access method 225. The access method can be native code. The access method can be a function of a mainframe OS that enables access to data on memory, disk, tape or other external devices.

The OS API can call the access method 225 at stage 220. The access method 225 can be in native code that can differ depending on the computing environment. Some examples are listed in FIG. 2, include UEFI PRM, UEFI RT, ARM SMC or HVC, RISC-V, and OpenPower. Some example access methods 225 for these environments are discussed below.

At stage 230, when the environment is UEFI PRM and the device tree specifies a PRM access method, the PRM can be exposed to device tree for use in calling the access method.

The PRM is a set of services that are provided by the UEFI on UEFI-based systems. These services allow applications to interact with the firmware and hardware on the system, and provide an interface for accessing system resources such as memory, I/O devices, and system configuration information. An example device tree description for this scenario is shown below in Table 4.

TABLE 4

```
{
  prm {
    compatible = "uefi,prm"
    /*
     * The PRMT table, since there is no ACPI, has to be located
     differently.
     */
    prmt-ma = <0x1234510>
    prmt-len = <0x1234>
  }
  dtrt {
    compatible = "dt,runtime"
    access-method = "prm"
  };
};
```

PRM normally has a heavy implementation in both UEFI and in the OS (e.g., since it does not share any of the RT service mappings). But in Table 4 the device tree can expose the PRMT table, which can exist in firmware. The PRMT table can identify access methods for use with PRM. This can include identifying where to find the access methods, which can be stored in memory. A globally unique identifier ("GUID") can be used for locating an access method.

UEFI RT is a set of services that are provided by the UEFI on UEFI-based systems. These services allow applications to interact with the firmware and hardware on the system and provide an interface for accessing system resources such as memory, I/O devices, and system configuration information.

In a UEFI RT environment, at stage 232, calling the access method can include using the EFI Configuration table to look up a service table. For example, the OS can look for a special service table inside the UEFI configuration that matches a GUID.

The GUID can be a pointer to table, such as shown in Table 5, below.

TABLE 5

```
struct DTRT_SERVICE_TABLE {
UINT32 MajorVersion; // 1
UINT32 MinorVersion; // 0
EFI_STATUS (*GetPropLen)(phandle_t node_handle, prhandle_t
property_handle, size_t *maxLen);
EFI_STATUS (*GetProp)(phandle_t node_handle, prhandle_t
property_handle, void *buffer, offset_t offset, size_t len, size_t
*actualLen);
EFI_STATUS (*SetProp)(phandle_t node_handle, prhandle_t
property_handle, void *buffer, offset, size_t len, size_t *actualLen);
};
```

Table 5 includes a DTRT service table with versioning info for checking compatibility and function pointers. In effect, this allows the computing device to retrieve properties at stage 220 using the same environment that every UEFI runtime environment uses for service calls. The properties retrieved can further describe the hardware of the computing device.

ARM is a family of instruction set architectures for computer processors developed by ARM Holdings. ARM processors are used in a variety of computing applications, including mobile phones, tablets, and embedded systems. ARM processors are designed to be power-efficient and provide high performance for their size and power consumption.

In an Arm SMC or HVC implementation, at stage 234, the computing device can utilize a Secure Monitor Call Calling Convention ("SMCCC") class for the access methods. The service calls can be in the SMC64 OEM Service Call range (0xC3000000-0xC300FFFF), or in the HVC64 Vendor Specific Hypervisor Service Call range (0xC6000000-0xC600FFFF), in an example. This implementation can be provided by Trusted Firmware-A or by a hypervisor, depending on the system.

The "getprop" and "setprop" functions of ARM do not take an explicit buffer parameter in one example. OS locking can be required. These can be required in the device tree DTRT node, as shown in Table 6, below.

TABLE 6

```
/ {
  dtrt {
    compatible = "dt, runtime"
    access-method = "arm"
    exchange-buffer-ma = <0xabcde000>
    exchange-buffer-len = <0x1000>
  };
};
```

RISC-V is an open-source Instruction Set Architecture ("ISA") developed by the RISC-V Foundation. RISC-V is designed to be a low-cost and low-power ISA that can be used in a variety of computing applications, such as embedded systems, mobile devices, and cloud computing.

In a RISC-V implementation at stage 236, the device tree can identify a table that includes exception identifiers ("EIDs") for the access functions. For example, an EID of 44545254 can be used for DTRT. Each EID can be associated with a specific exception handler, which is a function that is invoked when the exception occurs. The EID can be used to determine which exception handler should be invoked when an exception occurs.

Like with ARM, the get property and set property calls in RISC-V don't take an explicit buffer parameter and OS locking is required. This information can be supplied in the device tree DTRT node, as shown in Table 7, below.

TABLE 7

```
/ {
  dtrt {
    compatible = "dt, runtime"
    access-method = "riscv, sbi"
    exchange-buffer-ma = <0xabcde000>
    exchange-buffer-len = <0x1000>
  };
};
```

OpenPower is a system architecture developed by IBM that is based on IBM Power processors. OpenPower systems are designed to be highly scalable and optimized for high-performance computing. OpenPower systems support open-source operating systems, such as Linux, and are used in a variety of applications, including cloud computing, machine learning, and artificial intelligence.

In an OpenPower implementation, at stage 238, the access method can utilize the OpenPower Abstraction Layer ("OPAL"). A DTRT call can be made to dtrt entry with a call token, a DTRT base, and arguments. The DTRT calls can return OPAL API-compatible return codes.

Table 8, below, includes an example device tree DTRT node description for use with OpenPower.

TABLE 8

```
/ {
    dtrt {
        compatible = "dt,runtime"
        access-method = "power"
        base-address = <>
        entry-address = <>
        runtime-size = <>
        exchange-buffer-ma = <>
        exchange-buffer-len = <>
    };
};
```

After making the access call at stage 220, the native language access metho of stage 225 can return a property at stage 240. The property can describe an aspect of hardware identified in the device tree, in an example.

At stage 245, the OS API can manage the identified hardware according to the received property in an example. For example, the OS can utilize device tree and the access calls to identify hardware type, address, and capabilities. The OS can identify and configure the hardware components with this information. This can enable the system to interact with the hardware.

Figure 3:
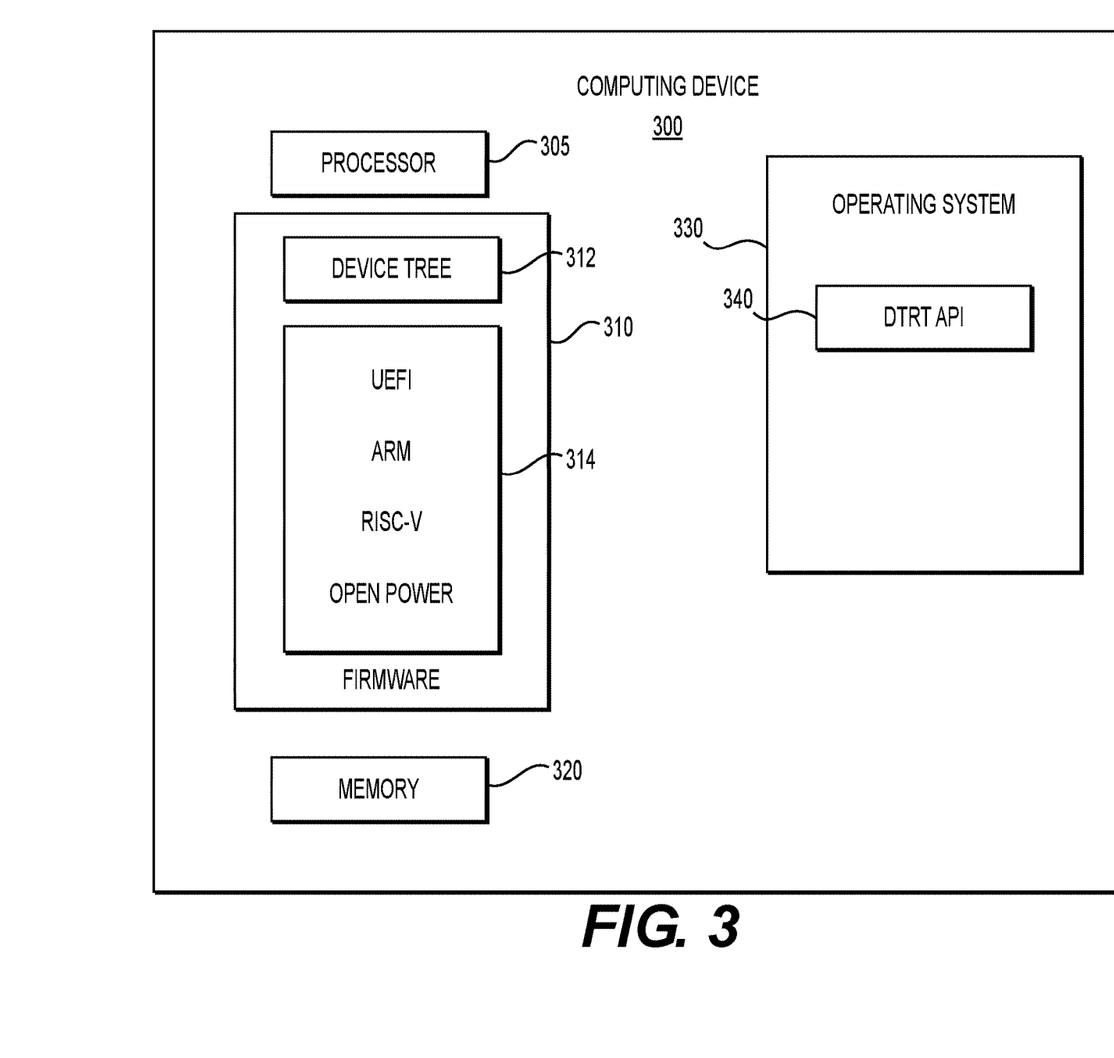
FIG. 3 is an exemplary illustration of system components for managing hardware of a computing device by using device tree with runtime management calls.

FIG. 3 is an illustration of a system for using a device tree runtime mechanism during boot to manage hardware on a device. A computing device 300 can include a processor 305, a firmware 310, a memory 320, and an OS 330. The computing device 300 can be one or more processor-based devices, such as a server, personal computer, tablet, cell phone, watch, or an internet of things ("IoT") device. Although references are made to a "computing device" throughout, the computing device can comprise multiple devices, including virtual or cloud-based devices.

The processor 305 can be a central processing unit that executes instructions for software applications. The processor 305 can also interact with firmware 310 by executing instructions stored in firmware 310. The firmware is a type of software that is pre-installed on a device and controls its basic functions. It is typically stored in non-volatile memory, such as read-only memory ("ROM") or flash memory, and is executed by the processor 305 when the computing device 300 is powered on. The firmware 310 provides a low-level interface between the processor 305 and the device's 300 hardware (mostly not pictured in FIG. 3), allowing the processor 305 to control and communicate with various hardware components. Additionally, firmware 310 may also include boot code, which is executed by the processor 305 at power-on to initialize the device 300 and load the operating system 330.

The firmware 310 can include mechanisms for loading the OS 330 and initializing and managing the hardware. These mechanisms can include device tree 312. The processor 305 interacts with the device tree 312 by using the information stored in the device tree 312 to configure and control the various hardware components of the system.

A device tree 312 is a data structure that describes the hardware layout of a system, including the devices connected to the processor 305, their addresses, and the resources they use. The device tree 312 can be stored in a file in a format that can be read by the processor's firmware 310.

When the system boots, the bootloader (of the OS 330) or firmware 310 reads the device tree 312 and uses the information it contains to configure the system's hardware. For example, it can use the information in the device tree 312 to determine the addresses of devices connected to the processor's 305 buses, such as memory 320 and peripheral devices, and configure the processor's 305 memory management unit to access them.

The device tree 312 can also contain information about the interrupts used by the devices and the processor's 305 interrupts controller is configured accordingly. The device tree 312 can also include the information about the clocks and the voltage regulators used by the hardware.

In short, the device tree 312 provides a way for the firmware 310 or operating system 330 to discover and configure the system's hardware, which allows the processor 305 to interact with and control the various devices connected to the system.

However, because the possible system hardware configurations are extremely numerous across different platforms and devices, the device tree 312 can be modified to utilize runtime methods 314 to retrieve properties that are not stored in the device tree 312. The runtime methods 314 can execute as native code rather than using the cumbersome AML of ACPI. Some example platforms for the runtime methods are listed in FIG. 3, and include UEFI, ARM, RISC-V, and OpenPower.

The device tree 312 can include a DTRT node that identifies the platform and runtime method 314. This can allow for retrieving the access method and utilizing data in the DTRT node to make access method calls to retrieve properties not explicitly defined in the device tree 312. The DTRT API 340 of the OS 330 can interpret the DTRT node information and call runtime methods 314 of the native platform to access additional hardware properties that are not pre-coded into the device tree 312.

As an example, the processor 305 can read a DTRT node in the device tree 312 that indicates UEFI is used for the access methods. The processor can then execute corresponding instructions that are stored in the UEFI firmware. UEFI is a type of firmware that is an alternative to the traditional BIOS firmware and is used to initialize and configure the system's hardware before the operating system is loaded.

The processor 305 can begin (or continue) executing the UEFI firmware 310, which performs a series of tasks to initialize and configure the system's hardware. The UEFI firmware can use the information stored in the system's firmware hub ("FWH") or firmware flash device ("FFD") to initialize the system's memory 320 and peripheral devices, such as disk drives and network controllers. It also performs a power-on self-test ("POST") to check the system's hardware for any errors.

Once the hardware is initialized and configured, the UEFI firmware can use the information stored in the system's device tree to discover and configure the system's hardware. It uses this information to determine the addresses of devices connected to the processor's buses, such as memory 320 and peripheral devices, and configure the processor's memory management unit to access them.

After the system's hardware is initialized and configured, the UEFI firmware 310 can then hand off control to the operating system's 330 bootloader, which is typically stored on a hard drive or other storage device. The UEFI firmware 310 also provides a user interface that allows the user to configure the system's settings, such as the boot order of storage devices, and to diagnose and troubleshoot hardware problems.

But as described above, other platforms can also be used with DTRT. For example, RISC-V is an open-source instruction set architecture that defines a set of instructions that a processor 305 can execute. The processor 305 interacts with RISC-V by executing instructions that are defined by the RISC-V ISA.

Once again, the DTRT node of the device tree 312 can specify using RISC-V access methods and provide parameters to use when making the calls. The DTRT API 340 of the OS 330 can interpret the DTRT node information and call access methods of the RISC-V architecture. When a method is written for RISC-V, it is typically compiled into machine code that consists of a series of instructions that the processor can execute. The processor 305 then fetches these instructions from memory and executes them one at a time. Each instruction is a binary code that tells the processor to perform a specific operation, such as loading a value from memory into a register, performing a mathematical operation, or branching to a different instruction.

The RISC-V ISA is designed to be simple and regular, which makes it easier for processors to implement and for software to optimize for. The RISC-V ISA defines a base instruction set, which includes instructions for basic operations such as arithmetic, logical operations, branching, and memory access, as well as a set of optional extensions that can be added to the base instruction set to provide additional functionality. These extensions include instructions for floating-point operations, multimedia operations, and atomic memory operations.

Processors 305 that implement the RISC-V ISA can have different implementations for these instructions, depending on the specific processor design, this allows for flexibility in the design of processors and also allows for the creation of processors 305 that are optimized for different use cases.

In summary, the processor interacts with RISC-V by executing instructions that are defined by the RISC-V ISA. The RISC-V ISA defines a set of instructions that a processor 305 can execute. The processor 305 fetches these instructions from memory and executes them one at a time.

Other examples of the disclosure will be apparent to those skilled in the art from consideration of the specification and practice of the examples disclosed herein. Though some of the described methods have been presented as a series of steps, it should be appreciated that one or more steps can occur simultaneously, in an overlapping fashion, or in a different order. The order of steps presented is only illustrative of the possibilities and those steps can be executed or performed in any suitable fashion. Moreover, the various features of the examples described here are not mutually exclusive. Rather any feature of any example described here can be incorporated into any other suitable example. It is intended that the specification and examples be considered as exemplary only, with a true scope and spirit of the disclosure being indicated by the following claims.

Although described in the context of an EMM system, the techniques for detecting and enforcing driving restrictions do not require an EMM system. The firmware bootstrapping techniques can also be carried out without a management server.

What is claimed is:

1. A method for booting a computing device using a device tree runtime ("DTRT") mechanism, comprising:
    during boot of the computing device, retrieving hardware data from a device tree, wherein the device tree is stored in firmware and describes hardware of the computing device, wherein the device tree includes a node with runtime method information;
    based on the runtime method information, identifying an access method using an application programming interface ("API"), wherein the access method retrieves a property of hardware described in the device tree, wherein the property is not already coded into the device tree;
    making a runtime call by executing the access method to retrieve the property; and
    managing, by a kernel of an operating system, physical hardware of the computing device based on the hardware data and the retrieved property.

2. The method of claim 1, wherein the managing includes supplying power to a pin of the physical hardware, the physical hardware being identified in the device tree and a power level or the pin being identified by the retrieved property.

3. The method of claim 1, wherein the method utilizes native code for the runtime call, the native code not being written in Advanced Configuration and Power Interface Machine Language.

4. The method of claim 1, wherein the access method enables access to data on a disk or drive of the computing device.

5. The method of claim 1, further comprising accessing and executing a second method based on the runtime method information in the device tree, wherein the second method is one of getting a length of the property and setting the property.

6. The method of claim 1, wherein the access method is a Unified Extensible Firmware Interface ("UEFI") access method that is retrieved from a Platform Runtime Mechanism ("PRM") table by the operating system.

7. The method of claim 1, wherein the method is retrieved from a Unified Extensible Firmware Interface ("UEFI") configuration table.

8. A computing device using a device tree runtime ("DTRT") mechanism during boot, comprising:
    a processor;
    an operating system; and
    firmware comprising a device tree that includes hardware data and a table for accessing runtime calls, wherein the hardware data describes hardware of the computing device, wherein the device tree includes a node with runtime method information;
    wherein the processor performs stages including:
        during boot of the computing device, retrieving the hardware data and runtime method information from the device tree;
        using the runtime method information to access, from the table, a method for retrieving a property of a node in the device tree, wherein the property is not in the device tree;
        making a runtime call by executing the method to retrieve the property; and
        managing, by the operating system, a physical hardware of the computing device based on the hardware data and the retrieved property.

9. The computing device of claim 8, wherein the method is retrieved from a Unified Extensible Firmware Interface ("UEFI") configuration table in the firmware.

10. The computing device of claim 8, wherein the method is an ARM secure monitor call ("SMC") or hypervisor call ("HVC").

11. The computing device of claim 8, wherein the managing includes supplying power to a pin of the computing device, the computing device being identified in the device tree and a power level or the pin being identified by the retrieved property.

12. The computing device of claim 8, wherein the method utilizes native code for the runtime call, the native code not being written in Advanced Configuration and Power Interface Machine Language.

13. The computing device of claim 8, wherein the method is an access method of the operating system that enables access to data on a disk, drive, or another memory device.

14. The computing device of claim 8, the stages further comprising accessing and executing a second method, wherein the second method is one of getting a length of the property and setting the property.

15. A non-transitory, computer-readable medium comprising instructions that, when executed by a processor of a computing device, cause the processor to perform stages for managing hardware on a computing device, the stages comprising:

during boot of the computing device, retrieving hardware data and runtime method information from a device tree in firmware;

using the runtime method information to access, from a table in the firmware, a method for retrieving a property of a node in the device tree, wherein the property is not in the device tree;

making a runtime call by executing the method to retrieve the property; and managing, by a kernel of an operating system, a physical hardware of the computing device based on the hardware data and the retrieved property.

16. The non-transitory, computer-readable medium of claim 15, wherein the method utilizes native code for the runtime call, the native code not being written in Advanced Configuration and Power Interface Machine Language.

17. The non-transitory, computer-readable medium of claim 15, wherein the method is one of three access methods available for use for retrieving properties based on the runtime method information from the device tree, including: a first method to get the property, a second method to get a length of the property, and a third method to set the property.

18. The non-transitory, computer-readable medium of claim 15, the stages further comprising accessing and executing a second method, wherein the second method is identified using the runtime method information from the device tree, and wherein the second method is one of getting a length of the property and setting the property.

19. The non-transitory, computer-readable medium of claim 15, wherein the method is a Unified Extensible Firmware Interface ("UEFI") access method that is retrieved from a Platform Runtime Mechanism ("PRM") table.

20. The non-transitory, computer-readable medium of claim 15, wherein the method is retrieved from a Unified Extensible Firmware Interface ("UEFI") configuration table.

\* \* \* \* \*